Patented Feb. 21, 1933

1,898,047

UNITED STATES PATENT OFFICE

MAX GLAUBITZ, OF BERLIN, AND HUGO HAEHN, OF BERLIN-FINKENKRUG, GERMANY, ASSIGNORS TO VERSUCHS- UND LEHRANSTALT FÜR BRAUEREI IN BERLIN, OF BERLIN, GERMANY, A CORPORATION OF GERMANY

BEER MANUFACTURE

No Drawing. Application filed June 4, 1930, Serial No. 459,413, and in Germany June 10, 1929.

In the fermentation of beer wort, as is well known the maltose is transformed by top or bottom fermenting brewers' yeast into alcohol and carbon dioxide. A fermented product is thus obtained which is free from maltose, and only contains dextrine, nitrogenous and mineral ingredients derived from the wort. It is not possible therefore to make a maltose-containing beer unless the fermentation is interrupted by killing the yeast, which involves considerable technical difficulties and undesirably affects the flavour.

The manufacture of beers weak in alcohol by the usual process with the use of brewer's yeast in the fermentation also leads to great difficulties; either weak starting wort is used leading to thin beer of bad flavour and weak in alcohol and also containing almost no extract, or using a starting wort of normal concentration, by forcible interruption of the fermentation of the yeast an extract containing beer, weak in alcohol is obtained, but this has an equally bad taste, and it is moreover almost impossible to predetermine the alcohol content owing to the difficulty of control.

The present invention overcomes both the technical difficulties and the bad taste of the finished product, heretofore encountered in the making of beer of for example low alcohol content and relatively high extract content.

Certain micro-organisms are known which ferment raw sugar and some hexoses but not maltose. Such micro-organisms are for example the following yeasts:—Saccharomycodes Ludwigii, Saccharomyces Delbrücki, Saccharomyces Marxianus, Saccharomyces Bailii, Torula pulcherrima. These micro-organisms, in particular Saccharomycodes Ludwigii, are suitable for the manufacture according to the invention of beers rich in maltose. Saccharomycodes Ludwigii particularly, having all the properties desirable in a yeast for brewing, as for example rapid strong fermentation, great multiplication and the like.

The process consists in using any of these micro-organisms, in particular Saccharomycodes Ludwigii, in a malt wort, to which such sugars as saccharose, invert sugar, dextroxe and the like have been added, and which are fermented by the micro-organism which does not affect the maltose. A fermented beverage is thus obtained containing alcohol, carbon dioxide, maltose and other extract substances, which has a very good flavour, whereas in an ordinary beer wort no noticeable fermentation would take place.

The sugar added to the malt wort is completely fermented so that it is possible to predetermine accurately the alcohol content of the finished beer; since furthermore a malt wort of any desired concentration can be started with, the extract content of the final product can also be predetermined as desired. It is therefore possible according to this process to obtain a beer of any desired alcohol and extract content. With a large content of extract there can be little alcohol and so forth.

The beverage is fully fermented since the whole liquid takes part in the fermentation and after fermentation no manipulations foreign to beer manufacture are necessary.

Example

To 100 liters of beer wort of 10° Balling are added 1 kg of saccharose and the wort boiled for a short while with hops. After filtration the wort is sterilized in a closed fermentation vat and after cooling treated with a pure culture of Saccharomycodes Ludwigii.

The fermented wort is then put into containers or bottles, and the beer then preferably pasteurized.

In this way a strongly foaming beer rich in maltose and containing about 0.5% of alcohol is obtained.

By increasing the addition of saccharose the alcohol content can be increased as desired, and by altering the starting wort, the extract content also can be regulated as desired.

What we claim is:—

1. A process for the manufacture of beer which consists in adding to a wort sugars which will be fermented by yeast not attacking maltose, and then fermenting the wort with yeast which does not attack maltose.

2. A process for the manufacture of beer which consists in adding to a wort sugar selected from the group consisting of saccharose, invert sugar, and dextrose, and then fermenting the wort with yeast selected from the group consisting of Saccharomycodes Ludwigii, Saccharomyces Delbrücki, Saccharomyces Marxianus, Saccharomyces Bailii, and Torula pulcherrima.

3. A process for the manufacture of beer which consists in adding to a wort sugar selected from the group consisting of saccharose, invert sugar, and dextrose and then fermenting the wort with Saccharomycodes Ludwigii.

4. A process for the manufacture of beer which consists in adding saccharose to a wort and then fermenting the wort with Saccharomycodes Ludwigii.

5. A process for the manufacture of beer which consists in adding to a wort sugars which will be fermented by yeast not attacking maltose, and then fermenting the wort in a closed vessel with yeast which does not attack maltose.

6. A process for the manufacture of beer which consists in adding a predetermined proportion of saccharose to a wort, and then fermenting the wort in a closed vessel with Saccharomycodes Ludwigii.

7. A process for the manufacture of beer which consists in adding a predetermined proportion of saccharose to a wort, boiling the wort with hops, filtering the wort, sterilizing the wort is a closed vessel, and then fermenting the wort with Saccharomycodes Ludwigii.

In testimony whereof we have signed our names to this specification.

MAX GLAUBITZ.
HUGO HAEHN.